United States Patent [19]

Hennessy

[11] 3,880,999
[45] Apr. 29, 1975

[54] SYNERGISTIC INSECTICIDAL COMPOSITIONS CONTAINING BENZYL 2-PROPYNYL ETHERS

[76] Inventor: Douglas J. Hennessy, 47 Grayson Pl., Teaneck, N.J. 07666

[22] Filed: July 5, 1972

[21] Appl. No.: 265,423

Related U.S. Application Data

[63] Continuation-in-part of Ser. No. 164,411, July 20, 1971, abandoned.

[52] U.S. Cl................................ 424/200; 424/339
[51] Int. Cl........................... A01n 9/36; A01n 9/24
[58] Field of Search ......... 424/200, 339; 260/611 A

[56] References Cited
UNITED STATES PATENTS
3,338,950  8/1967  Seki et al.................... 260/611 A X
3,362,871  1/1968  Felia et al...................... 424/300 X

OTHER PUBLICATIONS

Pesticide Index, 4th Ed., 1969, p. 188.
Hennessy, "The Potential of Carbamate Synergists as Pest Control Agents," U.S.–Japan Seminar, (1969).

*Primary Examiner*—Albert T. Meyers
*Assistant Examiner*—Leonard Schenkman
*Attorney, Agent, or Firm*—Frederick H. Rabin; Philip P. Berestecki

[57] ABSTRACT

Certain benzyl 2-propynyl ethers have been found to enhance the activity of insecticides, particularly organophosphorus and chrysanthemum mono- and dicarboxylic ester insecticides. These compounds have the formula

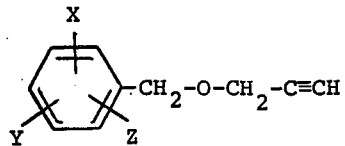

in which X, Y and Z represent hydrogen, nitro, halogen other than iodine, or, when X is hydrogen, Y and Z taken together may represent methylenedioxy.

14 Claims, No Drawings

SYNERGISTIC INSECTICIDAL COMPOSITIONS CONTAINING BENZYL 2-PROPYNYL ETHERS

CROSS REFERENCE TO RELATED APPLICATION

This is a continuation-in-part of application Ser. No. 164,411, filed July 20, 1971, now abandoned.

This invention relates to propynyl compounds, to new synergistic insecticidal compositions comprising such compounds, and to their use.

It has been discovered that certain propynyl compounds, more fully described below, synergistically enchance the acitivty of insecticides, particularly carbamate, organophosphorus and chrysanthemum mono- and di-carboxylic ester insecticides. This synergistic action is, moreover highly selective in that the toxicity of the insecticides to warm-blooded animals is not appreciable increased.

The propynyl synergist compounds of the invention operate to protect the envirnoment in which they are used by permitting the use of a lesser dose of insecticide to obtain a percentage insect mortality comparable to that which would result from a larger dose of insecticide alone. This is of particular importance where the insecticide is environmentally persistent or is highly toxic to birds, fish or mammals. Further, in a number of instances, these propynyl synergist compounds broaden the spectrum of activity of the insecticide. They also restore the activity of insecticides against insects which have developed resistance to the insecticide where such resistance is due to metabolism, i.e. enzymic detoxification, of the insecticide. In so restoring activity against resistant insects, it is believed that the propynyl synergist compounds act to inhibit enzymic detoxification.

The insecticidal compounds with which the synergist compounds of this invention may be used include the following substances:

PHOSPHORIC ACID DERIVATIVES
Bis- O,O-diethylphosphoric acid anhydride (TEPP)
O,O,O,O-Tetrapropyldithiopyrophosphate
Dimethyl(2,2,2-trichloro-1-hydroxyethyl)phosphonate (TRICHRORFON)
1,2-Dibromo-1,2-dichlorethyldimethylphosphate (NALED)
2,2-Dichlorovinyldimethylphosphate (DICHLORFOS)
2-Methoxycarbamyl-1-methylvinyldimethylphosphate (MEVINPHOS)
Dimethyl-1-methyl-2-(methylcarbamoyl)vinylphosphate cis (MONOCROTOPHOS)
3-(Dimethoxyphosphinyloxy)-N-methyl-N-methoxy-cis-croton-amide
3-(Dimethoxyphosphinyloxy)-N,N-dimethyl-cis-crotonamide (DICROTOPHOS)
2-Chloro-2-diethylcarbamoyl-1-methylvinyldimethylphosphate (PHOSPHAMIDON)
O,O-Diethyl-O-2-(ethylthio)-ethylthiophosphate (DEMETON)
O,O-Diethyl-S-2-(ethylthio)-ethylthiophosphate
S-Ethylthioethyl-O,O-dimethyl-dithiophosphate (THIOMETON)
O,O-Diethyl-S-ethylmercaptomethyldithiophosphate (PHORATE)
O,O-Diethyl-S-2-[(ethylthio)ethyl]dithiophosphate (DISULFOTON)
O,O-Dimethyl-S-2-(ethylsulphinyl)ethylthiophosphate (OXYDEMETONMETHYL)
O,O-Dimethyl-S-(1,2-dicarbethoxyethyl)dithiophosphate (MALATHION)
(O,O,O,O-Tetraethyl-S,S'-methylene-bis-[dithiophosphate](ETHION)
O-Ethyl-S,S-dipropyldithiophosphate
0,0-Dimethyl-S-(N-methyl-N-formylcarbamoylmethyl)-dithiophosphate (FORMOTION)
S-N-(1-Cyano-1-methylethyl)carbamoylmethyldiethylthiolphosphate (CYANTHOAT)
S-(2-Acetamidoethyl)-O,O -dimethyldithiophosphate
Hexamethylphosphoric acid triamide (HEMPA)
O,O-Dimethyl-O-p-nitrophenylthiophosphate (PARATHION-METHYL)
O,O-Diethyl-O-p-nitrophenylthiophosphate (PARATHION)
O-Ethyl-O-p-nitrophenylthiophosphonate (EPN)
0,0-Dimethyl-0-(4-nitro-m-tolyl)thiophosphate (FENTITROTHION)
O,O-Dimethyl-O-(2-chloro-4-nitrophenyl)thiophosphate (DICAPTHON)
O,O-Dimethyl-O-p-cyanophenylthiophosphate (CYANOX)
0-Ethyl-0-p-cyanophenylphenylthiophosphonate (DICHROFENTHION)
O--2,4-Dichlorophenyl-O-methylisopropylamidothiophosphate
O,O-Dimethyl-O-2,4,5-trichlorophenylthiophosphate (RONNEL)
O-Ethyl-O-2,4,5-trichlorophenylethylthiophosphonate (TRICHLORONAT)
O,O-Dimethyl-O-2,5-dichloro-4-bromophenylthiophosphate (BROMOPHOS)
O,O-Diethyl-O-2,5-dichloro-4-bromophenylthiophosphate (BROMOPHOS-ETHYL)
4-tert. Butyl-2-chlorophenyl-N-methyl-O-methylamidophosphate (CRUFOMAT)
Dimethyl-p-(methylthio)phenylphosphate
O,O-Diemthyl-O-(3-methyl-4-methylmercaptophenyl)thiophosphate (FENTHION)
Isopropylamino-O-ethyl-O-(4-Methylmercapto-3-methylphenyl)-phosphate
O,O-Diethyl-O-p-[(methylsulphinyl)phenyl]-thiophosphate (FENSULFOTHION)
O,O-Diemthyl-O-p-sulphamidophenylthiophosphate
O-[p-(Dimethylsulphamido)phenyl]O,O-dimethylthiophosphate (FAMPHUR)
O,O,O',O'-Tetramethyl-O,O'-thiodi-p-phenylenethiophosphate
O-(p-(p-Chlorophenylazophenyl)O,O-dimethylthiophosphate (AZOTHOAT)
O-Ethyl-S-phenyl-ethyldithiophosphonate
O-Ethyl-S-4-chlorophenyl-ethyldithiophosphonate
O-Isobutyl-S-p-chlorophenyl-ethyldithiphosphonate
O,O-Dimethyl-S-p-chlorophenylthiophosphate
O,O-Diemthyl-S-(p-chlorophenylthiomethyl)-dithiophosphate
O,O-Diethyl-p-chlorophenylmercaptomethyl-dithiophosphate (CARBOPHENOTHION)
O,O-Diethyl-S-p-chlorophenylthiomethyl-thiophosphate
O,O-Diemthyl-S-(carbethoxy-phenylmethyl)dithiophosphate (PHENOTHOAT)
O,O-Diethyl-S-(carbofluoroethoxy-phenylmethyl)-dithiophosphate O,O-Dimethyl-S-(carbisopropoxy-phenylmethy)-dithiophosphate
O,O-Dimethyl-O-(alpha-methylbenzyl-3-hydroxy-crotonyl)phosphate,
2-Chloro-1-(2,4-dichlorophenyl)vinyl-diethylphosphate (CHLORFENVINPHOS)
2-Chloro-1-(2,4,5-trichlorophenyl)vinyl-dimethylphosphate
O-(2-Chloro-1-(2,5-dichlorophenyl)vinyl)-O,O-diethylthiophosphate
Phenylglyoxylonitriloxime-O,O-diethylthiophosphate (PHOXIM)
O,O-Diethyl-O-(3-chloro-4-methyl-2-oxo-2-H-1-benzopyran-7-yl)-thiophosphate (COUMAPHOS)
O,O-Diethyl-7-hydroxy-3,4-tetramethylene-coumarinyl-thiophosphate (COUMITHOAT)
2,3-p-Dioxanedithiol-S,S-bis(O,O-diethyldithiophosphate) (DIOXATHION)
2-Methoxy-4-H-1,3,2-benzodioxaphosphorine-2-sulphide
O,O-Diethyl-O-(5-phenyl-3-isooxyzolyl (sic)) thiophosphate
S-[(6-Chlor-2-oxo-3-benzoxazolinyl)methyl]O,O-diethyldithiophosphate (PHOSALON)
2-(Diethoxyphosphinylimino)-4-methyl-2,3-dithiolane
O,O-Dimethyl-S-[2-methoxy-1,3,4-thiadiazol-5-(4H)-onyl-(4)-methyl]dithiophosphate
Tris-(2-methyl-1-aziridinyl)-phosphine-oxide (METEPA)
O,O-Dimethyl-S-phthalimidomethyl-dithiophosphate
S-(2-Chloro-1-phthalimidoethyl)-O,O-diethyldithiophosphate
N-Hydroxynaphthalimido-diethylphosphate
Dimethyl-3,5,6-trichloro-2-pyridylphosphate
O,O-Dimethyl-O-(3,5,6-trichloro-2-pyridyl)thiophosphate
O,O-Diethyl-O-(3,5,6-trichloro-2-pyridyl)thiophosphate
O,O-Diethyl-O-2-pyrazinylthiophosphate (THIONAZIN)
O,O-Diethyl-O-(2-quinoxylyl)thiophosphate
O,O-Dimethyl-S-(4-oxo-1,2,3-benzotriazin-3(4H)-ylmethyl)-dithiophosphate (AZINPHOSMETHYL)
O,O-Diethyl-S-(4-oxo-1,2,3-benzotriazin-3(4H)-ylmethyl)-dithiophosphate (AZINPHOSETHYL)
S-[(4,6-Diamino-s-triazin-2-yl)methyl]-O,O-dimethyldithiophosphate (MENAZON)
S-[2-(Ethylsulphonyl)ethyl]dimethylthiolphosphate (DIOXYDEMETON-S-METHYL)
Diethyl-S-[2-(ethylsulphinyl)ethyl]dithiophosphate (OXYDISULFOTON)
Bis-O,O-diethylthiophosphoric acid anhydride (SULFOTEP)
Dimethyl-1,3-di(carbomethoxy)-1-propen-2-yl-phosphate
Dimethyl-(2,2,2-trichloro-1-butyroyloxyethyl)phosphonate (BUTONAT)
O,O-Dimethyl-O-(2,2-dichloro-1-methoxy-vinyl)phosphate
O,O-Dimethyl-O-(3-chloro-4-nitrophenyl)thiophosphate (CHLORTHION)
O,O-Dimethyl-O(or S)-2-(ethylthioethyl)thiophosphate (DEMETON-S-METHYL)
Bis-(dimethylamido)fluorophosphate (DIMEFOX)
2-(O,O-Dimethyl-phosphoryl-thiomethyl)-5-methoxy-pyrone-4
3,4-Dichlorobenzyl-triphenylphosphonium chloride Dimethyl-N-methoxymethylcarbamoylmethyl-dithiophosphate (FORMOCARBAM)
O,O-Diethyl-O-(2,2-dichloro-1-chlorethoxyvinyl)-phosphate
O,O-Dimethyl-O-(2,2-dichloro-1-chlorethoxyvinyl)-phosphate
O-Ethyl-S,S-diphenyldithiolphosphate
O-Ethyl-S-benzyl-phenyldithiophosphonate
O,O-Diethyl-S-benzyl-thiolphosphate
O,O-Dimethyl-S-(4-chlorophenylthiomethyl)dithiophosphate (METHYLCARBOPHENOTHION)
O,O-Dimethyl-S-(ethylthiomethyl)dithiophosphate Di-isopropylaminofluorophosphate (MIPAFOX)
O,O-Dimethyl-S-(morpholinylcarbamoylmethyl)dithiophosphate (MORPHOTHION)
Bismethylamido-phenylphosphate
O,O-Dimethyl-S-(benzenesulphonyl)dithiophosphate
O,O-Dimethyl-(S and O)-ethylsulphinylethylthiophosphate
O,O-Diethyl-O-4-nitrophenylphosphate
O,O-Diethyl-S-(2,5-dichlorophenylthiomethyl)dithiophosphate (PHENDAPTON)
Triethoxy-isopropoxy-bis (thiophosphinyl)disulphide
O,O-Diethyl-O-(4-methyl-coumarinyl-7)-thiophosphate (POTASAN)
2-Methoxy-4H-1,3,2-benzodioxaphosphorine-2-oxide
Octamethylpyrophosphoramide (SCHRADAN)
Bis(dimethoxythiophosphinylsulphido)-phenylmethane
5-Amino-bis(dimethylamido)phosphinyl-3-phenyl-1,2,4-triazole (TRIAMIPHOS)
N-Methyl-5-(O,O-dimethylthiolphosphoryl)-3-thiavaleramide (VAMIDOTHION) and
N,N,N',N'-Tetramethyldiamidofluorophosphate (DIMEFOX)

Carbamic Acid Derivatives

1-Naphthyl-N-methylcarbamate (CARBARYL)
2-Butinyl-4-chlorophenylcarbamate
4-Dimethylamino-3,5-xylyl-N-methylcarbamate
4-Dimethylamino-3-tolyl-N-methylcarbamate (AMINOCARB)
3,4,5-Trimethylphenyl-N-methylcarbamate
2-Chlorophenyl-N-methylcarbamate (CPMC)
5-chlor-6-oxo-2-norbornane-carbonitrile-O-(methyl-carbamoyl)-oxime
1-(Dimethylcarbamoyl)-5-methyl-3-pyrazolyl-N,N-dimethylcarbamate (DIMETILAN)
2,3-Dihydro-2,2,-dimethyl-7-benzofuranyl-N-methylcarbamate (CARBOFURAN)
2-Methyl-2-methylthio-propionaldehyde-O-(methyl-carbamoyl)oxime (ALDICARB)
8-Quinaldyl-N-methylcarbamate and its salts
Methyl 2-isopropyl-4-(methylcarbamoyloxy)carbanilate
m-(1-Ethylpropyl)phenyl-N-methylcarbamate
3,5-Di-tert.butyl-N-methylcarbamate
m-(1-Methylbutyl)phenyl-N-methylcarbamate
2-Isopropylphenyl-N-methylcarbamate
2-sec.Butylphenyl-N-methylcarbamate
m-Tolyl-N-methylcarbamate
2,3-Xylyl-N-methylcarbamate
3-Isopropylphenyl-N-methylcarbamate
3-tert.Butylphenyl-N-methylcarbamate
3-sec.-Butylphenyl-N-methylcarbamate
3-Isopropyl-5-methylphenyl-N-methylcarbamate (PROMECARB)

3,5-Diisopropylphenyl-N-methylcarbamate
2-Chlor-5-isopropylphenyl-N-methylcarbamate
2-Chloro-4,5-dimethylphenyl-N-methylcarbamate
2-(1,3-Dioxolan-2-yl)phenyl-N-methylcarbamate (DIOXACARB)
2-(4,5-Dimethyl-1,3-dioxolan-2-yl)phenyl-N-methylcarbamate
2-(1,3-Dioxan-2-yl)phenyl-N-methylcarbamate
2-(1,3-Dithiolan-2-yl)phenyl-N-methylcarbamate
2-(1,3-Dithiolan-2-yl)phenyl-N,N-dimethylcarbamate
2-Isopropoxyphenyl-N-methylcarbamate (ARPROCARB)
2-(2-Propinyloxy)phenyl-N-methylcarbamate
2-(2-Propinyloxy)phenyl-N-methylcarbamate
3-(2-Propinyloxy)phenyl-N-methylcarbamate
2-Dimethylaminophenyl-N-methylcarbamate
2-Diallylaminophenyl-N-methylcarbamate
4-Diallylamino-3,5-xylyl-N-methylcarbamate (ALLYXICARB)
4-Benzothienyl-N-methylcarbamate
2,3-Dihydro-2-methyl-7-benzofuranyl-N-methylcarbamate
3-Methyl-1-phenylpyrazol-5-yl-N,N-dimethylcarbamate
1-Isopropyl-3-methylpyrazol-5-yl-N,N-dimethylcarbamate (ISOLAN)
2-(N',N'-Dimethylcarbamoyl)-3-methylpyrazol-5-yl-N,N-dimethylcarbamate
2-Dimethylamino-5,6-dimethylpyrimidin-4-yl-N,N-dimethylcarbamate
3-Methyl-4-dimethylaminomethyleneiminophenyl-N-methylcarbamate
3-Dimethylamino-methyleneiminophenyl-N-methylcarbamate
1-Methylthio-ethylimino-N-methylcarbamate (METHOMYL)
2-Methylcarbamoyloxyimino-1,3-dithiolane
5-Methyl-2-methylcarbamoyloxyiminio-1,3-oxathiolane
2-(1-Methoxy-2-propoxy)phenyl-N-methylcarbamate
2-(1-Butin-3-yl-oxy)phenyl-N-methylcarbamate
3-Methyl-4-(dimethylamino-methylmercapto-methyleneimino) phenyl-N-methylcarbamate
1,3-Bis(carbamoylthio)-2-(N,N-dimethylamino)-propane hydrochloride
5,5-Dimethylhydroresorcinodimethylcarbamate
2-[Propargylethylamino]-phenyl-N-methylcarbamate
2-[Propargylmethylamino]-phenyl-N-methylcarbamate
2-[Dipropargylamino]-phenyl-N-methylcarbamate
3-Methyl-4-[dipropargylamino]-phenyl-N-methylcarbamate
3,5-Dimethyl-4-[dipropargylamino]-phenyl-N-methylcarbamate
2-[Allyl-isopropylamino]-phenyl-N-methylcarbamate and
3-[Allyl-isopropylamino]-phenyl-N-methylcarbamate.
Chlorinated Hydrocarbons
γ-Hexachlorocyclohexane [Gammerxane;Lindane; γ HCH]
1,2,4,5,6,7,8,8-Octachloro-3α,4,7,7α'-tetrahydro-4,7-methyleneindane [Chlordan]
1,4,5,6,7,8,8-Heptachloro-3α,4,7,7α-tetrahydro-4,7-methyleneindane [Heptachlor]
1,2,3,4,10,10-Hexachloro-1,4,4α,5,8,8α-hexahydro-endo-1,4-exo-5,8-dimethanonaphthalene [Aldrin]
1,2,3,4,10,10-Hexachloro-6,7-epoxy-1,4,4α,5,6,7,8,8α-octahydro-exo-1,4-endo-5,8-dimethanonaphthalene [Dieldrin] ditto, endo-endo [Endrin]
6,7,8,9,10,10-Hexachloro-1,5,5α,6,9,9α-hexahydro-6,9-methano-2,3,4 benzo[e]-dioxa-thiepene-3-oxide [Endosulfan]
Chlorinated camphor [Toxaphen]
Decachloroctahydro-1,3,4-metheno-2H-cyclobuta[e d] pentalen-2-one
Dodecachloroctahydro-1,3,4-metheno-1H-cyclobuta[c d]pentalene [Mirex]
Ethyl-1,1α,3,3α,4,5,5,5α,5α,6-decachloroctahydro-2-hydroxy-1,3,4-metheno-1H-cyclobuta[c d]pentalene-2- laevulinate
Bis(pentachloro-2,4-cyclopentadien-1-yl) Dinoctone
1,1,1-Trichloro-2,2-bis(p-chlorophenyl)ethan [DDT]
Dichlorodiphenyl-dichloroethane [TDE]
Di(p-chlorophenyl)-trichloromethylcarbinol [Dicofol]
Ethyl-4,4'-dichlorophenylglycollate [Chlorobenzylate]
Ethyl-4,4'-dibromobenzylate [Bromobenzylate]
Isopropyl-4,4'-dichlorobenzylate
1,1,1-Trichloro-2,2 bis(p-methoxyphenyl)ethane [Methoxychlor] Diethyl-diphenyl-dichloroethane
Decachloropentacyclo(3,3,2, $0^{2,6}$, $0^{3,9}$, $0^{7,10}$)decan-4-one [Chlordecon].

Nitrophenols and Derivatives 4,6-Dinitro-6-methylphenol Na salt [dinitrocresol]
Dinitrobutylphenol-2,2',2''-triethanolamine salt
2-Cyclohexyl-4,6-dinitrophenol [Dinex]
2-(1-Methylheptyl)-4,6-dinitrophenyl-crotonate [Dinocap]
2 sec.-Butyl-4,6-dinitrophenyl-3-methyl-butenoate [Binapacryl]
2 sec.-Butyl-4,6-dinitrophenyl-cyclopropionate and
2 sec.-Butyl-4,6-dinitrophenyl-isopropyl-carbonate [Dinobuton]

Various Substances

Sabadilla
Rotenone
Cevadine
Veratridine
Ryania
Pyrethrin
3-Allyl-2-methyl-4-oxo-2-cyclopenten-1-yl-chrysanthemumate (Allethrin)
6-Chloropiperonyl-chrysanthemumate (Barthrin)
2,4-Dimethylbenzyl-chrysanthemumate (Dimethrin)
2,3,4,5-Tetrahydrophthalimidomethyl-chrysanthemumate
(5-Benzyl-3-furyl)-methyl-2,2-dimethyl-3-(2-methylpropanyl) cyclopropanecarboxylate
Nicotine
Bacillus thuringiensis Berliner
Dicyclohexylcarbodiimide
Diphenyldiimide
4-Chlorobenzyl-4-chlorophenylsulphide [Chlorobenside]
Creosote oil
6-Methyl-2-oxo-1,3-dithiolo-[4,5-b]-quinoxaline [Quinomethionate]
(l)-3-(2-Furfuryl)-2-methyl-4-oxocyclopent-2-enyl(l)-(cistrans)chrysanthemum-monocarboxylate [Furethrin]
2-Pivaloyl-indane-1,3-dione [Pindon]

2-Fluorethyl(4-bisphenyl)acetate
2-Fluoro-N-methyl-N(1-naphthyl)-acetamide
Pentachlorophenol and salts
2,2,2-Trichloro-N-(pentachlorophenyl)-acetimidoyl chloride
N'-(4-Chloro-2-methylphenyl)-N,N-dimethylformamidine (Chlorphenamidine)
4-Chlorobenzyl-4-fluorophenyl-sulphide (Fluorobenside)
5,6-Dichloro-1-phenoxycarbanyl-2-trifluoromethyl-benzimidazole (Fensoflor)
Tricyclohexyl-stannic-hydroxide
2-Thiocyanatoethyl-lauric acid ester
β-Butoxy-β'-thiocyanatodiethyl-ether
Isobornyl-thiocyanatoacetate
p-Chlorophenyl-p-chlorobenzenesulphonate (Ovex)
2,4-Dichlorophenyl-benzenesulphonate
p-Chlorophenyl-benzenesulphonate (Fenson)
p-Chlorophenyl-2,4,5-trichlorophenylsulphone (Tetradifon)
p-Chlorophenyl-2,4,5-trichlorophenylsulphide (Tetrasul)
Methyl bromide
p-Chlorophenyl-phenylsulphone
p-Chlorobenzyl-p-chlorophenylsulphide (Chlorobenside)
4-Chlorophenyl-2,4,5-trichlorophenylazosulphide
2(p-tert.-Butylphenoxy)-1-methylethyl-2-chloroethyl-sulphite
2(p-tert.-Butylphenoxy)cyclohexyl-2-propinyl-sulphite
4,4'-Dichloro-N-methylbenzenesulphonanilide
N-(2-Fluoro-1,1,2,2-tetrachloroethylthio)-methanesulphonanilide
2-Thio-1,3-dithiolo-(4,5-6)quinoxaline (Thioquinox)
Chloromethyl-p-chlorophenylsulphone 1,3,6,8-Tetranitrocarbazole and
Prop-2-ynyl-(4-t-butylphenoxy)-cyclohexylsulphite (Propargil).
Chrysanthemum mono- and di-carboxylic esters
3-(2,4-pentadienyl)-4-oxo-2-cyclopenten-1-yl chrysanthemumate
3-(2-(2-butenyl)-4-oxo-2-cyclopenten-1-yl chrysanthemumate
3-allyl-2-methyl-4-oxo-2-cyclopenten-1-yl chrysanthemumate
6-chloropiperonyl chrysanthemumate
2,4-dimethylbenzyl chrysanthemumate
2,3,4,5-tetrahydro-phthalimidomethyl chrysanthemumate
(5benzyl-3-furyl) methyl chrysanthemumate
methyl 3(2,4-pentadienyl)-4-oxo-2-cyclopenten-1-yl chrysanthemumdicarboxylate
methyl 3(2-butenyl)-4-oxo-2-cyclopenten-1-yl chrysanthemumdicarboxylate Preferred insecticides are the carbamate compounds, particularly 1-naphthyl methylcarbamate (carbaryl), 4-benzo(b)-thienyl-N-methylcarbamate (Mobam), 3-methyl-1-phenyl-5-pyrazolyl-N-methyl-carbamate (pyrolan), 1-(dimethylcarbamoyl)-5-methyl-3-pyrazolyl dimethylcarbamate (Dimetilan), o-isopropoxyphenyl methylcarbamate (Baygon), 8-(2-methylquinolyl)-N-methylcarbamate (GS 13798), and 3,5-diisopropylphenyl methylcarbamate (HRS 1422). Also preferred are the phosphoric acid derivatives, particularly O,O-dimethyl-S-[2-methoxy-1,3,4-thiadiazol-5-(4H)-onyl-(4)-methyl]-dithiophosphate (GS 13005), O,O-diethyl-O-(2-isopropyl-4-methyl-6-pyrimidyl)-phosphorothioate (Diazinon), 2-chloro-1-(2,4,5-trichlorophenyl)-vinyl dimethyl phosphate (Gardona), and 3-hydroxy-N,N-dimethyl-cis-crotonamide dimethyl phosphate (Bidrin).

The new compounds of this invention are represented by the formula

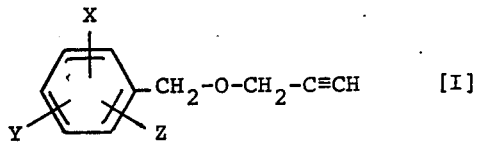

wherein X, Y and Z are all halogen other than iodine. Preferred are those compounds in which X, Y and Z are all chlorine atoms, particularly those with 2,3,4 2,3,6 and 2,4,5 configurations.

The lethality of insecticidal compounds, particularly carbamates has been found to be enhanced synergisitically by benzyl 2-propynyl ethers represented by the formula

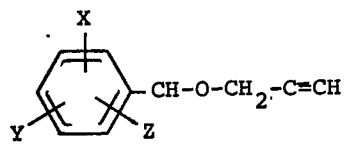

wherein X, Y and Z represent hydrogen, nitro, halogen other than iodine, or, when X is hydrogen, Y and Z taken together may represent methylenedioxy, and provided that, when both X and Y are hydrogen, Z is other than nitro.

Examples of these benzyl 2-propynyl ethers are given in Table II and their synergistic activity with insecticidal carbamates is illustrated in Example 2.

TABLE II

| Compound No. | X | Y | Z |
|---|---|---|---|
| II-A | H | H | 4—Cl |
| II-B | H | 2—Cl | 4—Cl |
| II-C | H | 3—Cl | 4—Cl |
| II-D | 2—Cl | 3—Cl | 4—Cl |
| II-E | 2—Cl | 3—Cl | 6—Cl |
| II-F | 2—Cl | 4—Cl | 5—Cl |
| II-G | H | 3,4—CH$_2$O$_2$ | |
| II-H | H | 2—Cl | 6—Cl |
| II-I | H | 2—NO$_2$ | 3—Cl |
| II-J | H | 2—NO$_2$ | 4—Cl |
| II-K | H | 2—NO$_2$ | 6—Cl |
| II-L | H | 3—NO$_2$ | 2—Cl |
| II-M | H | 3—NO$_2$ | 4—Cl |
| II-N | H | 4—NO$_2$ | 2—Cl |
| II-O | H | 4—NO$_2$ | 3—Cl |

It has been found that the lethality of insecticidal organophosphorus compouds and of the aforesaid cyclopropanecarboxylic acid esters is synergistically enhanced by benzyl 2-propynyl ethers represented by the formula

R—CH$_2$—O—CH$_2$—C ≡ CH wherein R represents an aromatic hydrocarbon selected from the class consisting of naphthyl and groups having the structural formula

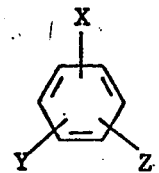

wherein X, Y and Z represent hydrogen, nitro or halogen other than iodine.

Examples of these benzyl 2-propynyl ethers are compounds II-A through II-F and II-H thorugh II-O, inclusive, and the compounds of Table IIa.

TABLE IIa

| Compound No. | R |
|---|---|
| II-P | $(2-NO_2)C_6H_4-$ |
| II-Q | $(4-NO_2)C_6H_4-$ |
| II-R | $\alpha-C_{10}H_7-$ |

The following example illustrates the preparation of these compounds.

EXAMPLE 1

Compounds II-A through II-F were prepared by following the general procedures of Guermont (1) and of Marszak, Diament and Guermont (2). To a stirred solution of 0.23 g (0.10 mol) of sodium metal dissolved in 90 ml of propynyl alcohol was added 0.01 mol of the appropriate benzyl halide. The reaction mixture was stirred at room temperature for three hours and then refluxed for one hour to insure completion of the reaction. The reaction mixture was poured into 100 ml of water, and the oily layer was extracted into ether. The ether layer was separated, washed with water, 10 percent sodium hydroxide solution, saturated sodium chloride solution, dried ($Na_2SO_4$) and concentrated in vacuo. Compounds II-A, II-B and II-C were distilled at reduced pressure, and compounds II-D and II-E and II-F were crystallized from 95 percent ethanol. Compound II-H may be similarly prepared using the appropriate benzyl halide.

1. J. P. Guermont, Mem. ser. chim. e'tat (Paris), 147 (1955).
2. I. Marszak, G. Diament and J. P. Guermont, Mem. ser. chim. e'tat (Paris) 35, 67 (1950).

Compound II-R was similarly prepared but was chromatographed on silica gel with benzene as the eluant.

Compounds II-P and II-Q were prepared in the following manner. A mixture of 1.38 g (0.01 mol) of anhydrous potassium carbonate, 0.01 mol of the appropriate benzyl halide and 1.38 g of propynyl alcohol dissolved in 100 ml of acetone was refluxed with stirring for twenty-four hours. The reaction mixture was poured into 100 ml of water, and the oily layer was extracted with ether. The ether layer was separated, washed with water, 10% sodium hydroxide solution, saturated sodium chloride solution, dried ($Na_2SO_4$) and concentrated in vacuo. Compound II-P was distilled at reduced pressure; II-Q was crystallized from 95% ethanol.

Compound II-G was prepared by a modification of the procedure employed in preparing compounds II-P and II-Q. 3,4-Methylenedioxybenzyl alcohol was substituted for propynyl alcohol, and propynyl bromide was substituted for the benzyl halide. The crude oil of II-G was dissolved hot in hexane, and upon cooling, the starting material, methylenedioxybenzyl alcohol precipitated. The solution was filtered, and the filtrate was concentrated in vacuo. The residue was chromatographed on an alumina column and eluted with benzene.

The 2-propynyl chloronitrobenzyl ethers, compounds II-I through II-O inclusive, were prepared as follows. A solution of 5 percent (w/v) sodium propynylate in propynyl alcohol was prepared by reacting sodium metal or sodium hydride with anhydrous propynyl alcohol. To 170 ml of the sodium propynylate/propynyl alcohol there was added 0.1 mol of the chloronitrobenzyl bromide or chloronitrobenzyl chloride and the mixture was stirred at room temperature for five hours and then refluxed until essentially free of benzyl halide (1–2 hrs.). The major portion of the propynyl alcohol was removed by distillation under reduced pressure and the residue was treated with 100 ml of water and extracted with ether or benzene. The organic layer was separated, washed with saturated sodium chloride, dried ($Na_2SO_4$) and fractionally distilled in vacuo to collect th respective chloronitrobenzyl 2-propynyl ether which was identified by infrared and nuclear magnetic resonance spectra.

The yields, melting or boiling points, analyses and spectral data are given in Tables III and IV.

TABLE III

| Compound No. | Yield % | Bp. (mm) or mp, °C | Analyses % Calcd. | Found | Ir, cm$^{-1}$ | (assignment) | Nmr data, $\delta$, ppm. (assignment) |
|---|---|---|---|---|---|---|---|
| II-A | 60 | 63–5 (0.05) | | | 3322 | (C≡C—H) | 6.96 (s,4,Ar—H) |
| | | | | | 2381 | (C≡C) | 4.33 (s,2,Ar—CH$_2$) |
| | | | | | | | 3.86 (d,2,J=2Hz,CH$_2$—C≡C—H) |
| | | | | | | | 2.19 (t,i,J=2Hz,C≡C—H) |
| II-B | 90 | 76–81 (0.05) | C 55.84 | 55.92 | 3279 | (C≡C—H) | 7.11 (m,3,Ar—H) |
| | | | H 3.75 | 3.83 | 2114 | (C≡C) | 4.40 (s,2,Ar—CH$_2$) |
| | | | | | | | 4.08 (d,2,J=2Hz,CH$_2$—C≡C—H) |
| | | | | | | | 2.38 (t,l,J=2Hz,C≡C—H) |
| II-C | 75 | 79–81 (0.07) | C 55.84 | 55.71 | 3322 | (C≡C—H) | 7.20 (m,3,Ar—H) |
| | | | H 3.75 | 3.83 | 2123 | (C≡C) | 4.48 (s,2,Ar—CH$_2$) |
| | | | | | | | 4.12 (d,2,J=2Hz,CH$_2$—C≡C—H) |
| | | | | | | | 2.35 (t,l,J=2Hz,C≡C—H) |
| II-D | 85 | 57 | C 48.14 | 48.11 | 3222 | (C≡C—H) | 7.31 (s,2,Ar—H) |
| | | | H 2.83 | 2.75 | 2171 | (C≡C) | 4.58 (s,2,Ar—CH$_2$) |
| | | | | | | | 4.19 (d,2,J=2Hz,Ch$_2$—C≡C—H) |
| | | | | | | | 2.28 (t,l,J=2Hz,C≡C—H) |
| II-E | 95 | 29 | C 48.14 | 48.24 | 3311 | (C≡C—H) | 7.49 (d,l,J=8Hz,Ar—H) |
| | | | H 2.83 | 2.85 | 2228 | (C≡C) | 7.26 (d,l,J=8Hz,Ar—H) |
| | | | | | | | 4.86 (s,2,Ar—CH$_2$) |
| | | | | | | | 4.23 (d,2,J=2Hz,O—CH$_2$) |
| | | | | | | | 2.44 (t,l,J=2Hz,C≡C—H) |
| II-F | 50 | 35 | C 48.14 | 48.02 | 3279 | (C≡C—H) | 7.50 (s,l,Ar—H) |
| | | | H 2.83 | 2.97 | 2279 | (C≡C) | 7.35 (s,l,Ar—H) |
| | | | | | | | 4.53 (s,2,Ar—CH$_2$) |
| | | | | | | | 4.23 (d,2,J=2Hz,CH$_2$—C≡C—H) |
| | | | | | | | 2.36 (t,l,J=2Hz,C≡C—H) |
| II-G | 20 | | C 69.46 | 69.68 | 3268 | (C≡C—H) | 6.87 (m,3,Ar—H) |
| | | | H 5.30 | 5.53 | 2123 | (C≡C) | 6.03 (s,2,O—CH$_2$—O) |
| | | | | | | | 4.53 (s,2,Ar—CH$_2$) |
| | | | | | | | 4.14 (d,2,J=2Hz,O—CH$_2$) |
| | | | | | | | 2.37 (t,l,J=2Hz,C≡C—H) |

TABLE IV

| Compound No. | Compound, name and formula | Yield, percent | B.P. (mm.) or M.P.,° C. | Analyses, percent | | | Ir, cm.⁻¹ (assignment) | NMR data, δ, ppm. (assignment) |
|---|---|---|---|---|---|---|---|---|
| | | | | | Calcd. | Found | | |
| II-P | {2-nitrobenzyl 2-propynyl ether, 2-NO₂C₆H₄–CH₂–O–CH₂–C≡CH} | 30 | 95 (0.05) | C<br>H<br>N | 62.82<br>4.74<br>7.33 | 62.77<br>4.81<br>7.37 | 3,279 (C≡C—H)<br>2,281 (C≡C)<br>1,650, 1,333 (NO₂) | 7.55 (m, 4, Ar—H)<br>4.73 (s, 2, Ar—CH₂)<br>4.08 (d, 2, J=2Hz, CH₂—C≡C—H)<br>2.23 (t, 1, J=2Hz, C≡C—H) |
| II-Q | {4-nitrobenzyl 2-propynyl ether, 4-NO₂C₆H₄–CH₂–O–CH₂–C≡CH} | 20 | 57 | C<br>H<br>N | 62.82<br>4.74<br>7.33 | 62.89<br>4.74<br>7.31 | 3,279 (C≡C—H)<br>2,119 (C≡C)<br>1,522, 1,351 (NO₂) | 7.64 (d, 2, J=8Hz, Ar—H)<br>7.00 (d, 2, J=8Hz, Ar—H)<br>4.21 (s, 2, Ar—CH₂)<br>3.71 (d, 2, J=2Hz, CH₂—C≡C—H)<br>1.97 (t, 1, J=2Hz, C≡C—H) |
| II-R | {α-naphthylmethyl 2-propynyl ether, α-C₁₀H₇–CH₂–O–CH₂–C≡CH} | 40 | | C<br>H | 85.68<br>6.16 | 85.93<br>6.24 | 3,250 (C≡C—H)<br>2,265 (C≡C) | 8.06 (m, 1, peri H)<br>7.55 (m, 7, Ar—H)<br>4.95 (d, 2, Ar—CH₂)<br>4.07 (d, 2, J=2Hz, O—CH₂)<br>2.34 (t, 1, J=2Hz, C≡C—H) |

TABLE V

The following are additional NMR spectral data for Some Substituted Benzyl Propynyl Ethers

| Structure | Cpd. No. | PROTON ASSIGNMENTS | | | |
|---|---|---|---|---|---|
| | | Aromatic | Benzylic | Propynylic | Acetylenic |
| unsubst. | | 7.27, s, 5H | 4.52, s, 2H | 4.05, d, 2H | 2.32, t, 1H |
| 2—Cl | | 7.02–7.55, m, 4H | 4.66, s, 2H | 4.18, d, 2H | 2.42, t, 1H |
| 3—Cl | | 7.20–7.34, m, 4H | 4.50, s, 2H | 4.13, d, 2H | 2.43, t, 1H |
| 4—Cl | II-A | 7.23, s, 4H | 4.48, s, 2H | 4.18, d, 2H | 2.42, t, 1H |
| 3—NO₂ | | 7.40–8.18, m, 4H | 4.67, s, 2H | 4.25, d, 2H | 2.52, t, 1H |
| 2,3—Cl₂ | | 6.98–7.48, m, 3H | 4.66, s, 2H | 4.24, d, 2H | 2.42, t, 1H |
| 2,4—Cl₂ | II-B | 7.05–7.47, m, 3H | 4.58, s, 2H | 4.22, d, 2H | 2.48, t, 1H |
| 2,5—Cl₂ | | 7.17–7.47, m, 3H | 4.59, s, 2H | 4.25, d, 2H | 2.43, t, 1H |
| 2,6—Cl₂ | II-N | 7.25, s, 3H | 4.83, s, 2H | 4.23, d, 2H | 2.52, t, 1H |
| 3,4—Cl₂ | II-C | 6.95–7.40, m, 3H | 4.45, s, 2H | 4.17, d, 2H | 2.57, t, 1H |
| 3,5—Cl₂ | | 7.23, s, 3H | 4.52, s, 2H | 4.14, d, 2H | 2.37, t, 1H |
| 2,4,5—Cl₃ | II-F | 7.47,7.62,ss, 2H | 4.62, s, 2H | 4.27, d, 2H | 2.42, t, 1H |
| 2—Cl,3—NO₂ | II-L | 7.30–7.90, m, 3H | 4.73, s, 2H | 4.38, d, 2H | 2.74, t, 1H |
| 2—Cl,4—NO₂ | II-N | 7.63–8.22, m, 3H | 4.73, s, 2H | 4.33, d, 2H | 2.49, t, 1H |
| 2—Cl,5—NO₂ | | 7.39–8.35, m, 3H | 4.68, s, 2H | 4.33, d, 2H | 2.51, t, 1H |
| 2—Cl,6—NO₂ | II-K | 7.24–7.76, m, 3H | 4.92, s, 2H | 4.18, d, 2H | 2.65, t, 1H |
| 3—Cl,4—NO₂ | II-O | 7.30–7.95, m, 3H | 4.67, s, 2H | 4.26, d, 2H | 2.47, t, 1H |
| 2—NO₂, 3—Cl | II-I | 7.48, s, 3H | 4.67, s, 2H | 4.22, d, 2H | 2.66, t, 1H |
| 2—NO₂, 4—Cl | II-J | 7.61–8.02, m, 3H | 4.82, s, 2H | 4.19, d, 2H | 2.30, t, 1H |
| 2—NO₂,4—Cl | | 7.40–8.30, m, 3H | 4.67, s, 2H | 4.33, d, 2H | 2.51, t, 1H |
| 3—NO₂,4—Cl | II-M | 7.54,7.92,ds, 3H | 4.67, s, 2H | 4.33, d, 2H | 2.76, t, 1H |

In the foregoing example, melting points were determined on a Fisher-Johns apparatus. Melting points and boiling points were uncorrected. Infrared spectra were obtained on a Perkin-Elmer 137 Grating Spectrophotometer. Nuclear magnetic resonance spectra were determined on Varian A-60 and A-60A NMR Spectrophotometers, probe temperature 38°, with signals reported relative to internal tetramethylsilane. Nuclear magnetic resonance spectra and infrared spectra were taken in carbon tetrachloride. Thin layer chromatograms were carried out on Silica Gel G coated glass slides. Column chromatography was performed using Alumina Woelm, Neutral, activity I. Yields were based upon isolated product and no developmental work was performed to improve yields.

The effectiveness of the synergists disclosed herein is believed to be largely due to their ability to interfere with or inhibit the action of mixed function oxygenase (MFO), an entity present in insects, and which, in many cases at least, serves to metabolize insecticides to relatively innocuous products and hence to render them non-lethal. It follows that the synergistic effectiveness of any particular synergist with any particular insecticide depends not only on the efficacy of the synergist in inhibiting MFO metabolism, but the degree to which the particular insecticide is susceptible to detoxification by MFO metabolism.

Thus, for example, the insecticide carbaryl has a relatively low lethality to the common house fly by virtue of the ease with which it undergoes MFO metabolism to innocuous products in that insect. Synergists according to the invention are therefore very effective in terms of raising the lethality of carbaryl. On the other hand the insecticide Dimetilan is relatively lethal to house flies and while it can still be synergized to a significant extent by compounds according to the invention, the increase in lethality is less (and hence the degree of synergism is less) than with carbaryl.

In general, carbamate insecticides are synergized by compounds according to the invention to the extent that a combination of carbamate and insecticide will have the same lethality as a significantly greater dose of insecticide alone. This is generally true also of the insecticidal esters of chrysanthemum mono- and dicarboxylic acids.

The effect of synergist candidates administered jointly with organophosphorus (OP) insecticides in many cases brings about increased lethality. However, in some instances unchanged lethality or even decreased lethality is observed. According to the present state of knowledge, the observed decrease in lethality can be attributed, especially with some phosphorothioate or -dithioate insecticides, to the fact that at least some MFO metabolites of those insectides are more lethal than the original compounds and the effectiveness of the original compounds as insecticides depends on MFO metabolism producing those lethal derivatives. By inhibiting or interfering with the MFO metabolism, it is postulated, the putative synergist may give a net effect in which inhibition of metabolic potentiation is of greater import than is inhibition of metabolic detoxification.

Where a net synergism is observed with OP insecticide, metabolic potentiation is either unimportant or is of less importance than metabolic detoxification. The lack of any effect by a synergist candidate can be explained either as a balancing of potentiation and detoxification, or as no significant inhibition of either type.

The following examples illustrate the enhanced lethality of insecticidal carbamates, insecticidal organophosphorus compounds and pyrethrum when utilized in conjunction with the above-described propynyl synergist compounds.

In the insecticidal compositions of the present invention comprising one of the aforementioned insecticidal compounds and one of the propynyl synergist compounds, from about 0.1 to about 10 parts by weight of the synergist compound may be employed per one part by weight of the insecticide compound. Preferably, there should be at least about 0.5 part by weight of synergist per one part by weight of insecticide.

The insecticidal compositions according to the invention may be used in a variety of ways and may be mixed with other materials such as vehicles, carriers and adjuvants whose nature will depend on the mode of application. Thus, for example, the active ingredients, insecticide and synergist, may be applied in a powder or dust in which case they may be mixed with a solid carrier such as a clay, for example, Fuller's earth, bentonite, talc, kieselguhr or diatomaceous earth. Non-clay carriers such as by-product lignin, wood, and walnut shell flour may also be used.

For liquid spray application the active ingredients may be dispersed or dissolved in a liquid carrier. Various carriers known to the art may be employed including water, hydrocarbon solvents of various descriptions, lower ketones, alcohols and mixtures of such materials, provided that they are substantially inert to the active ingredients.

In some cases emulsions or dispersions of the active ingredients in the liquid carrier may be desirable and such may be prepared by agitation of the active ingredients with the carrier. Surface active emulsifying or dispersing agents may be employed to aid in the procedure, and in this connection there may be mentioned fatty alcohol sufates, for example, sulfonated castor oil or alkyl benzene sulfonates, soaps, such as sodium oleate and non-ionic surfactants such as high molecular weight alkyl polyglycol ethers. Such emulsifying and dispersing agents commonly possess wetting agent properties.

Compositions according to the invention may also contain adjuvants such as wetting agents and humectants.

In general, use compositions according to the invention (including the carrier and various adjuvants) may be formulated according to known techniques, and, in accordance with conventional practice, may contain from about 2 percent to about 20 percent by weight active ingredients (synergist and insecticide), though, of course, concentrates containing say 10–80 percent active ingredients may be prepared for sale with subsequent dilution by the user. It is contemplated that formulations according to the invention may be employed in aerosol dispensers, in which case the above proportions do not include the aerosol propellant. In aerosol uses the proportion of propellant to total charge will be that normally employed, for example, 25–95 percent of the total charge.

EXAMPLE 2

Synergism of Insecticidal Carbamates By Benzyl 2-Propynyl Ethers.

The synergistic effect with carbaryl and pyrolan of the synergist compounds II-A through II-H was determined by the jar-film assay technique using unsexed, susceptible, three to 5-day old, Wilson strain house flies that had not been subjected to selection by treatment with insecticide. The required solutions of the insecticide and of the synergist compound were prepared in acetone at a concentration of one milligram per milliliter. One-pint wide mouth glass jars were coated with the appropriate insecticide-synergist combination by rolling the jars containing aliquots of the appropriate solutions diluted to three milliliters with acetone to deposit, by evaporation, a film of the test materials. The flies were transferred under carbon dioxide anesthesia and held in the jar at room temperature. Perforated aluminum foil was used to cover the jars and to hold cotton saturated with 10% sugar solution. Counts were made at intervals, but the recorded mortality was based on 24-hour kill, rather than knockdown. All prostrate nonmoving flies were considered dead. A determination was then made of the contact synergistic ratio [SR], which is the ratio of the $LC_{50}$ of insecticide alone to the $LC_{50}$ of the insecticide when applied together with the synergist. The $LC_{50}$ of the insecticide was estimated from a log-probit plot of percent kill versus dosage. The $LC_{50}$ of carbaryl alone for the Wilson strain fly is 1.0 mg/jar, by the jarfilm assay technique; for pyrolan alone, the $LC_{50}$ is 0.15 mg/jar. The $LC_{50}$ of the combination of insecticide and synergist was determined at a synergist to insecticide parts by weight ratio of five to one. The results are shown in Table VI.

TABLE VI

| Compound No. | Contact Synergistic Ratio Carbaryl | Pyrolan |
|---|---|---|
| II-A | 50 | 7 |
| II-B | 50 | 15 |
| II-C | 100 | 15 |
| II-D | 200 | 30 |
| II-E | 120 | 20 |
| II-F | 150 | 15 |
| II-G | 100 | 15 |
| II-H | 300 | 40 |

The effect of compounds II-C, II-D and II-E with Dimetilan and GS 13798 was determined from tests on polyvalent resistant (CH strain) houseflies that had been chilled and to the dorsal region of which was applied an acetone solution of synergist and insecticide at a ratio of two to one. Duplicate tests were performed using ten four to five-day old female houseflies per test. After dosage, the flies were put in a plastic petri dish with cotton soaked in a sugar-water solution. The percent kills after 24 hours for the two tests were averaged and are shown in Table VII. These doses of insecticide used without synergist caused 10–40 percent mortality.

In Table VII, and in the tables following it, the doses of topically applied insecticides and of synergists unless otherwise noted are expressed as micrograms per fly ($\mu$g/fly).

TABLE VII

| | | Dimetilan | GS 13798 |
|---|---|---|---|
| Insecticide dose: | 0 | 2 | 1 |
| Synergist dose: | 10 | 4 | 2 |
| Synergist Compound No. | | | |
| II-C | 0 | 100 | 92 |
| II-D | 0 | 100 | 100 |
| II-E | 10 | 100 | 100 |

The synergistic effect of benzyl 2-propynyl ethers with mobam was determined from topical application tests on IN/WHO and Rutgers A strain houseflies. The synergist and insecticide were dissolved in ACS Grade acetone in such quantities that a 1.0 $\mu$ liter volume applied to the thorax of 3-to-5 day old $CO_2$-anesthetized female adult house flies contained the desired dosage. After being treated, the flies were confined, 10 to a plaster petri dish, with 3-5 dishes/treatment, and held for 24-hr. observation of mortality. Reconstituted skim milk on cotten dental wicks was provided during the holding period. The percent kills after 24 hours are shown in Table VIII for the IN/WHO strain and Table IX for the Rutgers A strain.

TABLE VIII

| Mobam dose: | 0 | 0.20 | 0.20 | 0.10 | 0.10 | 0.05 | 0.05 |
|---|---|---|---|---|---|---|---|
| Synergist dose: | 1.0 | 0 | 1.0 | 0 | 0.50 | 0 | 0.25 |
| Synergist Compound No. | | | | | | | |
| II-C | — | 2 | 99 | 0 | 27 | 0 | 4 |
| II-D | 0 | 2 | 100 | 0 | 50 | 0 | 10 |
| II-E | 0 | 2 | 100 | 0 | 33 | 0 | 5 |
| II-H | 10 | 25 | 100 | | | | |
| II-I | 7 | 25 | 97 | | | | |
| II-J | 13 | 25 | 100 | | | | |
| II-K | 10 | 25 | 100 | | | | |
| II-L | 3 | 25 | 89 | | | | |
| II-M | 10 | 25 | 90 | | | | |
| II-N | — | 12 | 97 | | | | |
| II-O | 10 | 25 | 60 | | | | |

TABLE IX

| Mobam dose: | 0 | 0 | 0.60 | 0.40 | 0.60 | 0.40 | 0.30 | 0.30 | 0.15 | 0.15 |
|---|---|---|---|---|---|---|---|---|---|---|
| Synergist dose | 7.5 | 5.0 | 0 | 0 | 3.0 | 2.0 | 0 | 1.5 | 0 | 0.75 |
| Synergist Compound No. | | | | | | | | | | |
| II-C | 0 | — | 4 | — | 67 | — | 0 | 20 | — | — |
| II-D | 0 | — | 4 | — | 92 | — | — | — | — | — |
| II-E | 0 | — | 4 | — | 99 | — | 0 | 70 | 0 | 17 |
| II-H | — | 7 | — | 7 | — | 100 | | | | |
| II-I | — | 3 | — | 7 | — | 37 | | | | |
| II-J | — | 0 | — | 7 | — | 70 | | | | |
| II-K | — | 0 | — | 7 | — | 97 | | | | |
| II-L | — | 0 | — | 7 | — | 52 | | | | |

TABLE X

| Synergist/Insecticide ratio: | Insecticide alone | 0.5/1 | 1/1 | 2/1 | 5/1 |
|---|---|---|---|---|---|
| Insecticide Dose | | | | | |
| 1.0 | 73 | 97 | 100 | 100 | 100 |
| 0.50 | 33 | 57 | 100 | 97 | 100 |
| 0.25 | 7 | 30 | 63 | 83 | 97 |
| 0.13 | 0 | 7 | 17 | — | 50 |

TABLE XI

| Synergist/Insecticide ratio: | Insecticide alone | 0.5/1 | 1/1 | 2/1 | 5/1 |
|---|---|---|---|---|---|
| Insecticide Dose | | | | | |
| 1.0 | 93 | 100 | 100 | 100 | 100 |
| 0.50 | 83 | 97 | 97 | 93 | 100 |
| 0.25 | 27 | 53 | 77 | 73 | 67 |
| 0.13 | — | 30 | 27 | 17 | 40 |

The effects of varying the insecticide dose and the synergist-insecticide ratio are further illustrated, with synergist compounds II-D, II-E, II-F and Mobam insecticide, in Tables X, XI and XII. Table X shows percent mortality of the subject IN/WHO houseflies 24 hours after topical application of Mobam, both with and without synergist compound II-D; Table XI shows the mortality data using synergist compound II-E; and Table XII shows the mortality data using synergist compound II-F.

TABLE XII

| Synergist/Insecticide ratio: | Insecticide alone | 0.5/1 | 1/1 | 2/1 | 5/1 |
|---|---|---|---|---|---|
| Insecticide Dose | | | | | |
| 1.0 | 93 | 100 | 93 | 93 | 100 |
| 0.50 | 83 | 70 | 83 | 80 | 97 |
| 0.25 | 27 | 33 | 57 | 27 | 73 |
| 0.13 | — | 3 | 10 | 0 | 23 |

The data in Table X illustrate that a dose of insecticide (1.0 μg/fly) which would not be considered to give adequate control (LD$_{73}$) does give such control (LD$_{97}$) when used with 0.5 μg of synergist. Furthermore when the applied dose consists of equal parts of Mobam and II-D, the dose of Mobam need only be 0.5 μg to achieve LD$_{100}$.

The synergistic effect of IN/WHO flies of synergist compound II-K with Dimetilan, pyrolan, Baygon and HRS 1422 is illustrated by the 24 hour percent mortality data in Tables XII, XIV and XV.

bles II and IIa was determined by topical application tests on IN/WHO strain, and Rutgers A strain and polyvalent, resistant, CH strain houseflies using the procedures of Example 2. The percent kills after 24 hours of IN/WHO strain flies are shown in Table XVI; of Rutgers A strain flies, in Table XVII; and of CH strain flies, in Table XVIII. The doses of insecticide alone to the CH strain flies caused 10–40 percent mortality.

TABLE XVI

| | Diazinon | | | | | GS 13005 | | | | |
|---|---|---|---|---|---|---|---|---|---|---|
| Insecticide dose: | 0 | 0.03 | 0.03 | 0 | 0.10 | 0.10 | 0.10 | 0.10 | 0.05 | 0.05 |
| Synergist dose: | 1 | 0 | 0.15 | 1 | 0 | 0.50 | 0.25 | 0.125 | 0 | 0.25 |
| Synergist Compound No. | | | | | | | | | | |
| II-C | 0 | 5 | 25 | — | — | — | — | — | — | — |
| II-D | 0 | 5 | 40 | — | — | — | — | — | — | — |
| II-E | 0 | 5 | 45 | — | — | — | — | — | — | — |
| II-H | — | — | — | 10 | 19 | 100 | — | — | — | — |
| II-I | — | — | — | 7 | 19 | 99 | — | — | — | — |
| II-J | — | — | — | 13 | 19 | 99 | — | — | — | — |
| II-K | — | — | — | 10 | 19 | 100 | — | — | — | — |
| II-L | — | — | — | 3 | 19 | 97 | — | — | — | — |
| II-M | — | — | — | 10 | 19 | 79 | — | — | — | — |
| II-N | — | — | — | — | 7 | 84 | — | — | — | — |
| II-O | — | — | — | 10 | 19 | 90 | — | — | — | — |
| II-P | 0 | 0 | 30 | 0 | 16 | 96 | 85 | 69 | 0 | 10 |
| II-Q | — | — | — | 0 | 16 | 90 | 67 | 43 | 0 | 25 |
| II-R | 0 | 0 | 22 | 0 | 12 | 68 | 65 | 49 | — | — |

TABLE XIII

| Dimetilan Dose | Dimetilan Alone | Dimetilan With Five Parts II-K |
|---|---|---|
| 0.25 | 100 | — |
| 0.13 | 43 | 100 |
| 0.063 | 17 | 70 |
| 0.031 | 0 | 7 |

TABLE XIV

| Pyrolan Dose | Pyrolan alone | Pyrolan With Five Parts II-K |
|---|---|---|
| 5.0 | 43 | — |
| 2.5 | 10 | — |
| 1.3 | 3 | — |
| 0.63 | 0 | — |
| 0.25 | — | 80 |
| 0.13 | — | 40 |
| 0.063 | — | 7 |

TABLE XV

| Insecticide | Baygon alone | Baygon With Five Parts II-K | HRS 1422 | HRS 1422 With Five Parts II-K |
|---|---|---|---|---|
| 0.125 | 0 | 83 | 0 | 77 |

EXAMPLE 3

Synergism of Insecticidal Organophosphorus Compounds By Benzyl 2-Propynyl Ethers.

The synergistic effect with Diazinon and GS 13005 of various of the benzyl 2-propynyl ethers identified in Ta-

TABLE XVII

| GS 13005 dose: | 0 | 1.0 | 1.0 |
|---|---|---|---|
| Synergist dose: | 5.0 | 0 | 5.0 |
| Synergist Compound No. | | | |
| II-H | 7 | 13 | 100 |
| II-I | 33 | 13 | 83 |
| II-J | 0 | 13 | 100 |
| II-K | 0 | 13 | 100 |
| II-L | 0 | 13 | 83 |
| II-M | 0 | 13 | 63 |
| II-N | — | 2 | 60 |
| II-O | 3 | 13 | 47 |
| II-P | 0 | 3 | 92 |
| II-Q | 0 | 3 | 100 |
| II-R | 0 | 2 | 55 |

TABLE XVIII

| | | Diazinon | GS 13005 |
|---|---|---|---|
| Insecticide dose: | 0 | 5 | 1 |
| Synergist dose: | 10 | 10 | 2 |
| Synergist Compound No. | | | |
| II-C | 0 | 95 | 75 |
| II-D | 0 | 60 | 95 |
| II-E | 10 | 65 | 100 |

The synergist effect on IN/WHO flies of synergist compound II-K with Gardona and Bidrin is illustrated by the 24 hour percent mortality data in Tables XIX and XX.

TABLE XIX

| Gardona Dose | Gardona Alone | Gardona With Five Parts II-K |
|---|---|---|
| 0.125 | 100 | — |
| 0.063 | 73 | 100 |
| 0.031 | 13 | 63 |

TABLE XX

| Bidrin Dose | Bidrin Alone | Bidrin With Five Parts II-K |
|---|---|---|
| 0.13 | 0 | 57 |
| 0.063 | 0 | 0 |

EXAMPLE 4

Synergism of Mobam and GS 13005 In German Male Cockroaches.

The synergistic effect with mobam of synergist compounds II-H and II-K is further illustrated by the 24 hour mortality data on German male cockroaches (Blatella Germanicus) shown in Table XXI. The synergists and insecticide were diluted in acetone and applied in small droplets to the thorax of the insect. These doses of synergist alone gave zero percent insect mortality.

TABLE XXI

| Mobam dose: | 0.12 | 0.12 |
|---|---|---|
| Synergist dose: | 0 | 0.60(a) |
| Synergist Compound No. | | |
| II-H | 10 | 90 |
| II-K | 10 | 100 |
| Control (b) | — | 7 |
| Control (c) | — | 0 |

(a) Pretreated with synergist two hours before applying insecticide.
(b) Treated with acetone at time of treatment with synergist and also at time of treatment with insecticide.
(c) Untreated.

The synergistic effect with GS 13,005 of compounds II-H, II-K, II-P, II-Q and II-R is illustrated by the 24 hour mortality of German male cockroaches shown in Table XXII. These doses of synergist alone caused zero percent insect mortality.

TABLE XXII

| GS 13005 dose: | 0.08 | 0.08 | 0.08 |
|---|---|---|---|
| Synergist dose: | 0 | 4.0 | 0.40(a) |
| Synergist Compound No. | | | |
| II-H | 15 | — | 100 |
| II-K | 15 | — | 100 |
| II-P | 23 | 60 | 90 |
| II-Q | 10 | — | 95 |
| II-R | 10 | — | 100 |
| Control (b) | 0 | 10 | 0 |
| Control (c) | 0 | 0 | 5 |

(a) Pretreated with synergist two hours before applying insecticide.
(b) Treated with acetone at time of treatment with synergist and also at time of treatment with insecticide.
(c) Untreated.

EXAMPLE 5

Synergism of Pyrethrum

The synergistic effect with pyrethrum of various synergist compounds was determined by topical application tests on polyvalent, resistant CH strain houseflies following the procedure of Example 2. The percent kills after 24 hours are reported in Table XXIII. Application of the insecticide alone caused 10–40 percent mortality.

TABLE XXIII

| Pyrethrum dose: | 0 | 2 |
|---|---|---|
| Synergist dose: | 10 | 4 |
| Synergist Compound No. | | |
| II-C | 0 | 50 |
| II-D | 0 | 30 |
| II-E | 10 | 78 |

The average percent knockdown of CH strain flies, as a function of time, resulting from spray application of pyrethrum, alone and with synergist, are given in Table XXIV. Duplicate tests were performed using 50 CH strain houseflies per test. Test solutions of 100 mg and 200 mg of pyrethrum per cc of acetone, 200 mg of synergist per cc of acetone, and a mixture of 100 mg of pyrethrum and 100 mg of synergist per cc of acetone were prepared. The fifty CH strain houseflies were put in a 40 liter spray chamber and 1 cc of the test solution was sprayed into the test chamber with a spray pistol. The synergist alone at 200 mg/cc caused no knockdown.

TABLE XXIV

| Synergist No. | Dose (Mg/cc) | | Minutes | | | | | | | | |
| | Pyrethrum | Synergist | 5 | 10 | 15 | 20 | 25 | 30 | 40 | 50 | 60 |
|---|---|---|---|---|---|---|---|---|---|---|---|
| — | 100 | 0 | 3 | 6 | 14 | 25 | 32 | 37 | 58 | 62 | 62 |
| — | 200 | 0 | 3 | 27 | 44 | 60 | 60 | 64 | 82 | 86 | 87 |
| II-E | 100 | 100 | 5 | 9 | 17 | 44 | 55 | 59 | 77 | 93 | 95 |

The selectivity of the synergist compounds of this invention is illustrated by the results of sleeping-time extension tests and of acute toxicity tests on Swiss albino white male mice.

EXAMPLE 6

Extension of Sleeping Time of Barbiturate and Non-Barbiturate Depressant Drugs by Synergists.

The effect of various synergist compounds on sleeping time of sodium secobarbital [Secobarbital] and of 3,3-diethyl-5-methyl-2,4-dioxypiperidine [Noludar] was determined by administering the drug, with and without synergist, to approximately 38-day old male mice weighing from 25 to 30 grams. Synergists were administered in each of two doses, 74.0 mg/kg (dilution being 2.0 mg/0.1 ml corn oil), and 110.0 mg/kg (dilution 3.0 mg/0.1 ml oil). Secobarbital was administered at a dose of 37.0 mg/kg (dilution 1.0 mg/0.1 ml water). Noludar was administered at a dose of 110.0 mg/kg (dilution 3.0 mg/0.1 ml water). The synergist was administered one hour prior to administration of the Secobarbital or Noludar. Secobarbital and Noludar sleeping times were obtained for both the control (drug only) and the treated (synergist plus drug) mice by noting the time lapse between the administration of the drug and the recovery of the righting reflex, i.e. when the animal regains conciousness and can walk up an inclined wooden tray with coordination. The relative sleeping time (R.S.) was noted. The R.S. is the extended sleeping time in the treated mice (synergist plus drug) divided by the sleeping time in the control mice (drug only). The mean sleeping time for the treated mice and the R.S. are shown on Table XXV for various synergist compounds.

The synergism of the acute toxicity of Dimetilan by various synergists was determined by tests on Swiss albino, white male mice aged five to six weeks and weighing 23 to 27 grams. The synergist and insecticides were dissolved in corn oil and the drugs were dissolved in distilled water. All compounds were administered intraperitoneally by injection in the lower quadrent of the abdomen. The synergist was administered in 0.1 ml of corn oil one hour prior to administration of the insecti-

TABLE XXV

| Synergist Compound No. | Secobarbital (37 mg/K) | | | | Noludar (110 mg/K) | |
|---|---|---|---|---|---|---|
| | Synergist (110 mg/K) | | Synergist (74 mg/K) | | Synergist (110 mg/K) | |
| | Mean Sleeping Time (Min.) | Relative Sleeping Time | Mean Sleeping Time (Min.) | Relative Sleeping Time | Mean Sleeping Time (Min.) | Relative Sleeping Time |
| II-C | 33 | 1.0 | — | — | 50 | 1.3 |
| II-D | 60 | 1.2 | — | — | 46 | 1.0 |
| II-E | 44 | 1.4 | — | — | 45 | 1.1 |
| II-F | 46 | 1.0 | — | — | 38 | 1.3 |
| II-H | 51 | 2.1 | 44 | 1.4 | 68 | 2.2 |
| II-I | 32 | 1.3 | 31 | 1.2 | 56 | 1.8 |
| II-J | 30 | 1.4 | 27 | 1.0 | 70 | 2.2 |
| II-K | 44 | 2 | 48 | 1.5 | 75 | 2.4 |
| II-L | 42 | 1.8 | 31 | 1.0 | 56 | 1.8 |
| II-M | 47 | 2 | 29 | 1.0 | 47 | 2.1 |
| II-N | 39 | 1.7 | 20 | 1.0 | 58 | 1.9 |
| II-O | 26 | 1.1 | — | — | 52 | 2.4 |
| II-P | 46 | 1.0 | — | — | 44 | 1.5 |
| II-Q | 73 | 1.6 | 30 | 1.1 | 41 | 2.1 |
| II-R | 96 | 1.6 | 35 | 1.2 | 49 | 1.7 |
| Sesoxane | — | 8.3 | — | 6.1 | — | 3.1 |

EXAMPLE 7

Synergism of Acute Toxicity of Dimetilan, GS 13005, Secobarbital and Methadone.

To determine the acute toxicity of dimetilan alone, eight dosage levels of Dimetilan, ranging from 4 to 32 mg per kg were applied to eight, Swiss, albino, white, male mice per dosage level. The mice weighed approximately 23 to 27 grams and were 5 to 6 weeks old. The number of mice dead 48 hours after administration of the Dimetilan (lethality) are shown in Table XXVI. The Dimetilan was administered intraperitoneally in 0.1 ml of corn oil one hour after the administration of the same dose of corn oil alone.

TABLE XXVI

| Dimetilan Dose (Mg/kg) | Lethality |
|---|---|
| 4.0 | 0 |
| 8.0 | 0 |
| 12.0 | 1 |
| 16.0 | 3 |
| 20.0 | 4 |
| 24.0 | 7 |
| 28.0 | 8 |
| 32.0 | 8 |

A dose level of 8 mg/kg of Dimetilan was utilized in the tests of synergism of acute toxicity as being the dose level just below that at which Dimetilan alone showed lethality to the mice.

To determine the acute toxicity of the synergist alone, various synergists were administered intraperitoneally at a dose of 1000 mg/kg to each of a group of eight mice. The number of animals dead at the end of 72 hours is reported in the left hand column of Table XXVII.

cide. Eight mice were treated, per dosage, with each synergist. The mice were watched for a minimum of 6 hours while held in a glass jar with bedding individually after intraperitoneal injection of the test solutions. Lethality was noted, the animals were weighed and transferred in cages, and food and water were supplied. Control mice were given 0.1 ml of corn oil at the time of administration of the synergist to the test mice and 0.1 ml corn oil plus Dimetilan at the time of administration of the insecticide to the test mice. The number of mice dead at the end of 48 hours is reported in Table XXVII.

TABLE XXVII

| Dimetilan dose (Mg/kg): | 0 | 8 | 8 |
|---|---|---|---|
| Synergist dose (Mg/kg): | 1000 | 240 | 80 |
| Synergist Compound No. | | | |
| II-C | — | 0 | — |
| II-D | 0 | 0 | — |
| II-E | — | 0 | — |
| II-F | — | 0 | — |
| II-H | 0 | 6 | 0 |
| II-I | — | 3 | 0 |
| II-J | — | 4 | 0 |
| II-K | 1 | 6 | 0 |
| II-L | — | 5 | 0 |
| II-M | — | 3 | 0 |
| II-N | — | 4 | 0 |
| II-O | — | 2 | 0 |
| II-P | 2 | 0 | — |
| II-Q | 7 | 1 | — |
| II-R | — | 2 | 0 |
| Sesoxane | 1 | 8 | 8 |
| Control (0.1 ml oil) | 0 | 0 | 0 |

By the same procedure, the synergism of acute toxicity of GS 13,005, Secobarbital and 6-dimethylamino-4,4-diphenyl-3-heptanone [Methadone] was determined. The mice lethality data are shown in Table XXVIII

TABLE XXVIII

| Insecticide or Drug Dose | (Mg/kg): | GS 13005 | Seco-barbital | Metha-done |
|---|---|---|---|---|
|  |  | 71 | 90 | 32 |
| Synergist Dose | (Mg/kg): | 213 | 215 | 215 |
| Synergist Compound No. |  |  |  |  |
| II-D |  | 3 | 1 | 2 |
| II-H |  | 7 | 0 | 4 |
| II-J |  | 6 | 0 | 3 |
| II-K |  | 3 | 1 | 2 |
| II-P |  | 6 | 0 | 0 |
| II-Q |  | 6 | — | — |
| Sesoxane |  | 0 | 6 | 5 |
| Control |  | 5(a) | 0(b) | 2(c) |

(a) GS 13005 (71 mg/kg) in 0.1 ml corn oil.
(b) Secobarbital (90 mg/kg) in 0.1 ml corn oil.
(c) Methadone (32 mg/kg) in 0.1 ml corn oil.

I claim:
1. An insecticidal composition comprising 0,0-dimethyl-S-[2-methoxy-1,3,4-thiadiazol-5(4H)-onyl-(4)-methyl]-dithiophosphate and, per part of said dithiophosphate, from 2 to 5 parts by weight of a benzyl propynyl ether of the formula

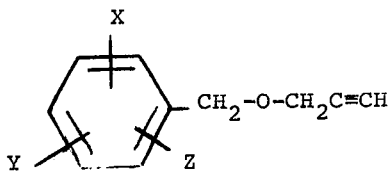

wherein each of X, Y and Z represents hydrogen, notro, or chlorine.

2. The insecticidal composition of claim 1 in which the benzyl propynyl ether is 3,4-dichlorobenzyl 2-propynyl ether.

3. The insecticidal composition of claim 1 in wich the benzyl propynyl ether is 2,3,4-trichlorobenzyl 2-propynyl ether.

4. The insecticidal composition of claim 1 in which the benzyl propynyl ether is 2,3,6-trichlorobenzyl 2-propynyl ether.

5. The insecticidal composition of claim 1 in wich the benzyl propynyl ether is 2,6-dichlorobenzyl 2-propynyl ether.

6. The insecticidal composition of claim 1 in which the benzyl propynyl ether is 2-nitro-3-chlorobenzyl 2-propynyl ether.

7. The insecticidal composition of claim 1 in which the benzyl propynyl ether is 2-nitro-4-chlorobenzyl 2-propynyl ether.

8. The insecticidal composition of claim 1 in which the benzyl propynyl ether is 2-nitro-6-chlorobenzyl 2-propynyl ether.

9. The insecticidal composition of claim 1 in which the benzyl propynyl ether is 2-chloro-3-nitrobenzyl 2-propynyl ether.

10. The insecticidal composition of claim 1 in which the benzyl propynyl ether is 3-nitro-4-chlorobenzyl 2-propynyl ether.

11. The insecticidal composition of claim 1 in which the benzyl propynyl ether is 2-chloro-4-nitrobenzyl 2-propynyl ether.

12. The insecticidal composition of claim 1 in which the benzyl propynyl ether is 3-chloro-4-nitrobenzyl 2-propynyl ether.

13. The insecticidal composition of claim 1 in which the benzyl propynyl ether is 2-nitrobenzyl 2-propynyl ether.

14. The insecticidal composition of claim 1 in which the benzyl propynyl ether is 4-nitrobenzyl 2-propynyl ether.

* * * * *